(No Model.)
J. MORRISON.
BRAKE FOR STREET CARS.
No. 560,226. Patented May 19, 1896.
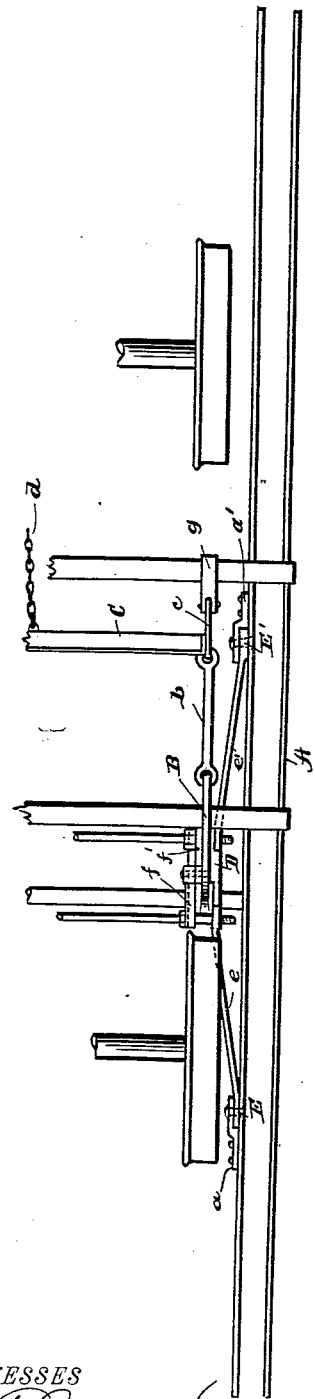
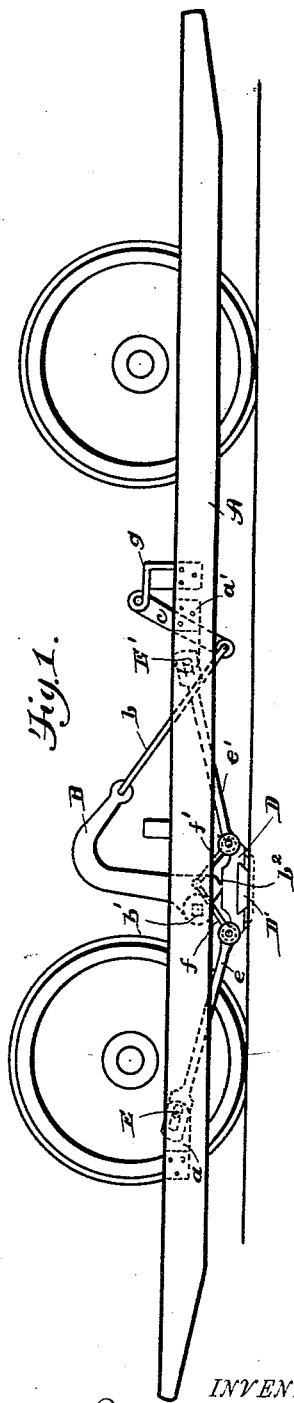
WITNESSES
L. H. Bradford
Virginia M. Clough.
INVENTOR
John Morrison
By Parker & Burton
Attorneys.

UNITED STATES PATENT OFFICE.

JOHN MORRISON, OF DETROIT, MICHIGAN, ASSIGNOR OF ONE-HALF TO ALBERT W. RUSSEL, OF SAME PLACE.

BRAKE FOR STREET-CARS.

SPECIFICATION forming part of Letters Patent No. 560,226, dated May 19, 1896.

Application filed March 26, 1896. Serial No. 584,897. (No model.)

*To all whom it may concern:*

Be it known that I, JOHN MORRISON, a citizen of the United States, residing at Detroit, county of Wayne, State of Michigan, have invented a certain new and useful Improvement in Brakes for Street-Cars; and I declare the following to be a full, clear, and exact description of the invention, such as will enable others skilled in the art to which it pertains to make and use the same, reference being had to the accompanying drawings, which form a part of this specification.

This invention relates to car-brakes, and has for its object an improved form of brake intended to be applied to and used with street-car trucks for the purpose of producing a braking action and stopping the car without applying any friction device to the wheel. The friction device or brake proper is applied by vertical pressure to the rail, and the brake-head and brake-shoe are hung loosely from the truck-frame.

In the drawings, Figure 1 is a side elevation of the truck-frame with the braking appliance attached thereto. Fig. 2 is a plan of a portion of the truck-frame and a portion of the brake appliance attached thereto.

A indicates the side bar of the frame of the truck, to which the axles are attached in the ordinary way. The details of this attachment are not shown because neither the wheels nor the axles will enter in any way to the brake structure.

To the frame A at a convenient point close to one of the wheels is hung a lever B, the main axis of which is upright with respect to the truck-frame. To the upper end of it is engaged a link $b$, that joins the lever B with the end of the hanger $c$. On the opposite side of the truck-frame is a similar lever B and a similar hanger $c$, and the two hangers $c$ are united by a cross-bar C, to the middle of which is engaged the brake-chain $d$.

The end of the lever B, which is below the fulcrum-pin $b'$, is round or cam-shaped and bears against the upper side of the hanging brake-head D. The brake-head D swings by two links $e\ e'$ from two pins E E', which pins are held by the side bar A to the frame and by the bracket $a'$, which is bolted to the side bar.

Each of the links $e\ e'$ has at the end which engages with the pin E or E', as the case may be, an elongated eye that permits the link to turn on the pin and also to slide for a limited distance over it. In addition to the two link-hangers $e\ e'$ the brake-head D is also suspended from the lever B by two flexible links $f\ f'$. These flexible links may be either chains or springs, and their point of attachment to the lever B is so arranged with respect to the cam face or head $b^2$ of the lever B that the distance between the point of suspension and the face of the head against which the cam bears does not increase when the brake-head is pushed downward by the action of the lever.

If springs are used, it would not be particularly material whether the distance increased or not, but if suspending chains are used there must be no strain on them when the brake-head is pushed downward by the action of the lever in operating it, and the adjustment of the length of the links $f\ f'$ should be such that the brake-head follows closely after the end of the lever, when that end rises and releases the brake. There must always be sufficient freedom of movement of the brake-head to allow the brake to slip forward or backward (always backward with respect to the movement of the car) until the eye at the end of the drawing-link (which is the forward link with respect to the movement of the car) begins to pull on the pin that passes through it.

The brake-head D is provided with a brake-shoe D', that is removable and can be renewed when worn out.

As shown in the drawings, the upper end of the brake-lever B is in the form of a gooseneck, but this form is immaterial as it might be entirely vertical, and the link $b$ engage with the top of it, or it might extend obliquely from the pin $b'$ and the point where it is shown as ending in the drawings. The form of this lever would be made to correspond with the class of trucks to which the brake is applied.

The hangers c are suspended from brackets g, bolted to the car-frame or to a cross-bar on the car-frame.

What I claim as novel is—

In combination with the frame of a car-truck, a hanging brake-head suspended by diverging links each of which is provided with an elongated eye at its end, and engages with a pin on the car-frame and by converging links that engage with the pin on a pressure-lever, a pressure-lever adapted to engage the brake-head and force it downward, and means for actuating the pressure-lever, substantially as described.

In testimony whereof I sign this specification in the presence of two witnesses.

JOHN MORRISON.

Witnesses:
ARTHUR T. WATERFALL,
ALBERT W. RUSSEL.